Nov. 20, 1956 G. F. McCARTHY ET AL 2,771,562
TELEPHONE RINGING GENERATOR
Filed April 11, 1955 2 Sheets-Sheet 1
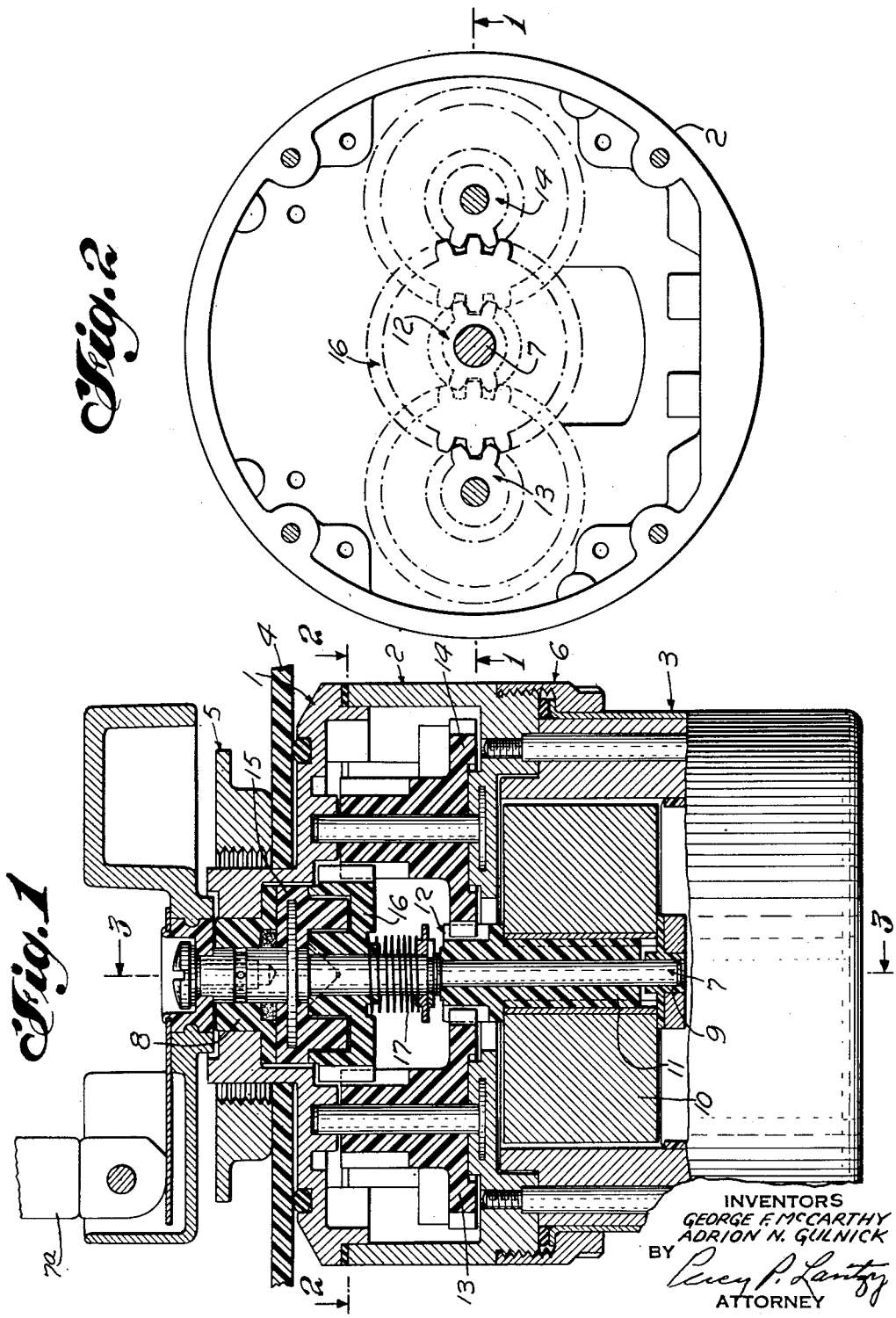
INVENTORS
GEORGE F. McCARTHY
ADRION N. GULNICK
BY
*Percy P. Lantry*
ATTORNEY Nov. 20, 1956　　　G. F. McCARTHY ET AL　　　2,771,562
TELEPHONE RINGING GENERATOR
Filed April 11, 1955　　　　　　　　　　　　2 Sheets-Sheet 2
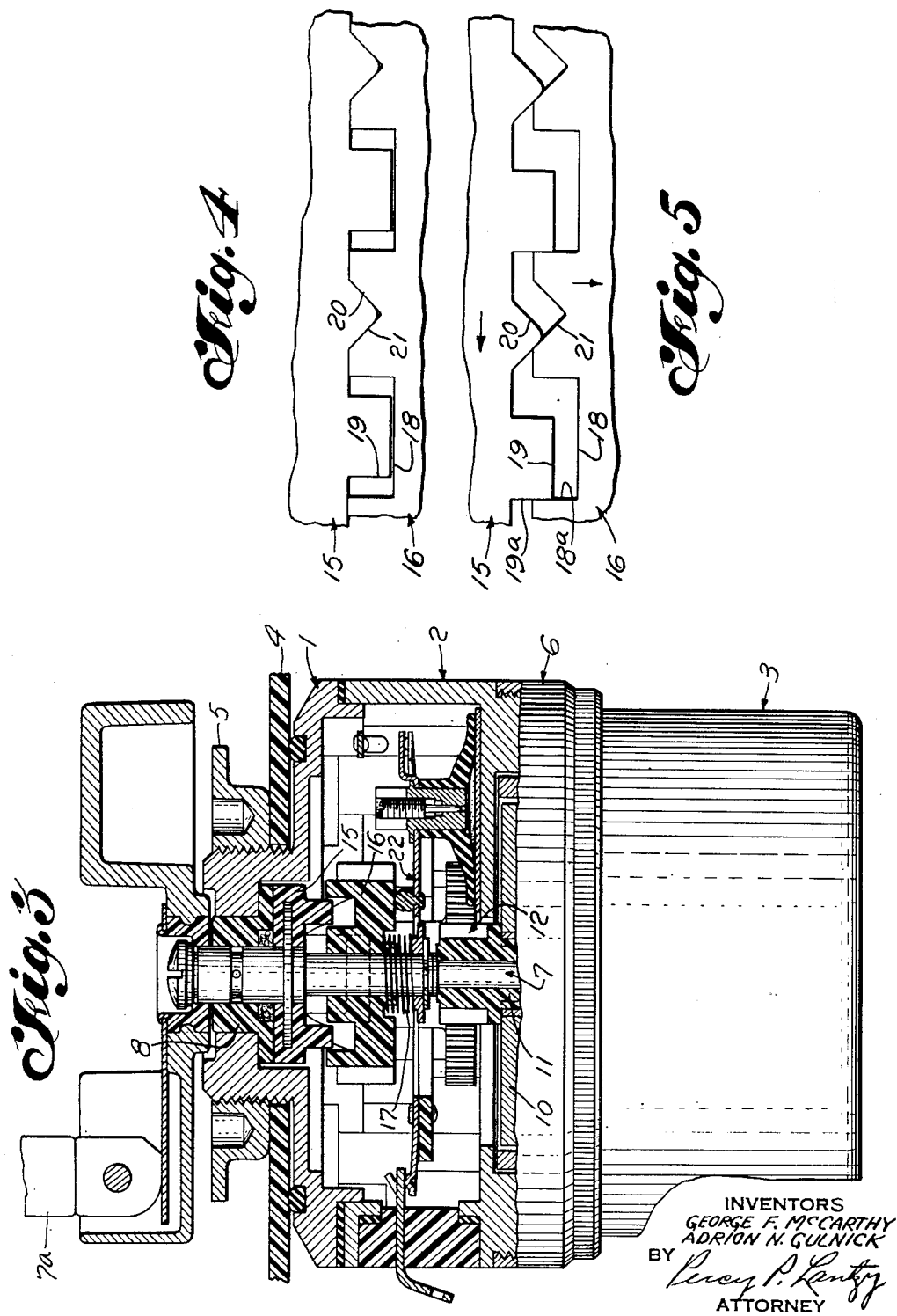
INVENTORS
GEORGE F. McCARTHY
ADRION N. GULNICK
BY Percy P. Lantry
ATTORNEY

United States Patent Office 2,771,562
Patented Nov. 20, 1956

2,771,562

TELEPHONE RINGING GENERATOR

George F. McCarthy, Teaneck, and Adrion N. Gulnick, Palisades Park, N. J., assignors to International Telephone and Telegraph Corporation, Nutley, N. J., a corporation of Maryland Application April 11, 1955, Serial No. 500,506

4 Claims. (Cl. 310—69)

This invention relates to a hand generator of the type used to produce ringing current at a telephone subscriber's set, and more particularly, to an improved bearing arrangement and driving mechanism for the rotor of such generators.

Generators of this type heretofore known have relatively short life particularly in view of wear on the rotor bearing resulting in wobble and inefficient operation. Further, where gearing is provided to effect a stepup drive for the rotor, the gearing requires lubrication which in turn renders it necessary to protect from the lubricant the usual switch needed to connect the generator to the line and disconnect the telephone set during ringing. This is usually done by locating the switch and a centrifugal actuating mechanism in a special housing at the end of the rotor remote from the gear drive which adds complications and cost to the generator.

An object of this invention is to provide an improved bearing and driving arrangement for the rotor of a generator, which is durable and relatively simple in construction.

Still another object is to provide in the driving mechanism of a generator an improved cam-clutch device for actuating a switch directly associated with the driving mechanism.

A feature of the present invention is a generator having a rotor rotatably mounted on the main drive shaft whereby the shaft coacts as a bearing for the rotor. The rotor is driven through a cam-clutch device and a radially balanced gear train for rotation in the same direction and at a higher speed than the shaft.

Another feature of the invention is a cam-clutch device having an axially sliding cam operated gear for actuating a switch when a shaft movement is initiated. This arrangement is made possible by making the gearing of a plastic material like "nylon" which is durable and operates without the addition of lubricants.

The above and further objects and features of this invention will become more apparent by reference to the following description and the accompanying drawings wherein:

Fig. 1 is an elevational view partially in section taken along the lines 1—1 of Fig. 2 showing the cam-clutch device in the normal position.

Fig. 2 is a plan view taken along the lines 2—2 of Fig. 1 showing the stepup gear train.

Fig. 3 is an elevational view partially in section taken along lines 3—3 of Fig. 1 showing the cam-clutch in an operated position.

Fig. 4 is a schematic representation of the cam-clutch device in a non operated position.

Fig. 5 is a schematic representation of the cam-clutch device in an operated position.

In the embodiment illustrated in Figs. 1–5 of the drawings, we have shown a bipolar generator of the permanent magnet rotor type. However, a great many variations of this embodiment may be made without departing from the scope of our invention.

With reference to the drawings and in particular Fig. 1, the generator of our invention is mounted within a substantial cylindrical moisture proof shell comprising housing elements 1, 2, and 3. The element 1 is an end closure adapted to be mounted on a panel 4 by a mounting nut 5. The central housing element 2 is joined to the other end element 3 by a retaining ring 6. The housing element 3 contains the stator and rotor of the generator, and detail information thereof may be had by reference to the copending application of O. C. From, L. B. Haigh and A. N. Gulnick Ser. No. 496,674 filed March 25, 1955.

A drive shaft 7 extends into the housing from a drive handle 7a and is supported by bearings 8 and 9. A rotor 10 is rotatably mounted on drive shaft 7 by a sleeve 11, one end of which is provided with a gear 12. The rotor is driven through a step-up gear train comprising rotor gear 12, Fig. 2, cluster gears 13, 14 and cam gear 16. The gears and bearings are preferably made of a plastic material such as "nylon."

The double cluster gears 13 and 14 mesh with the rotor gear 12 and the cam gear 16 at points which are diametrically opposite. This results in reducing the unit tooth load and in the cancellation of the radial components of the driving forces so as to minimize the bearing reaction, and hence the friction, between the shaft 7 and both the cam gear 16 and the rotor sleeve 11. Reduction of friction at these surfaces results in enhanced mechanical efficiency and prolonged bearing life.

The step-up gearing ratio is such that a low-speed rotation of the drive shaft 7 results in a more rapid rotation of the rotor 10, in the direction of the rotation of the drive shaft 7.

A cam-clutch device is mounted on the drive shaft 7 comprising a first part 15 carried by the shaft 7 and a second part 16 rotatably and axially moveable on the shaft. The part 16 is biased toward the part 15 by restoring spring 17. Parts 15 and 16 are formed of plastic material into annular elements schematically illustrated in Figs. 4 and 5 comprising complementary U-shaped clutch portions 18, 19 and complementary V-shaped cam portions 20 and 21. The clutch portions 18 are larger than clutch portions 19 thereby providing for a relative rotational movement during which the cam portions 20 ride up on portions 21 in an axial direction until the wall portions 18a and 19a engage as indicated in Fig. 5. The cam-clutch 16 is returned to the normal position by the restoring spring 17 and the V-shaped cam portions 20 and 21.

It may be seen from the above description that rotation of the drive shaft 7 in either direction will move cam portion 16 axially, to actuate the switching device 22. The U-shaped portions 18 and 19 transmit the driving torque to the rotor 10, Fig. 3, and the cam surfaces 20, 21 transmit an axial force to operate the switching device 22. This arrangement relieves the cam portions 20 and 21 of the rotary driving torque, the latter being performed by the engaging surfaces 18a and 19a. For further information on the details of switch 22 and its operation reference may be had to the copending application of A. N. Gulnick Serial No. 500,507 filed April 11, 1955.

From the foregoing description it will be clear that we have provided a relatively simple and yet durable bearing for the rotor and also a balanced driving mechanism incorporating a novel cam-clutch arrangement for actuation of the usual switch, which now can be located adjacent the gearing since the later does not require the addition of lubricants.

While we have described above the principles of our invention in connection with specific apparatus, it is to be clearly understood that this description is made only by way of example and not as a limitation to the scope of our invention.

We claim:

1. An electric generator comprising a drive shaft, a rotor, means to transfer driving movement from said shaft to said rotor, said transfer means having a first cam element, a driving gear having a second cam element and a driven gear disposed in cooperation with the gear teeth of said driving gear, said first cam element being fixed to said drive shaft and said driving gear being rotatably carried by said shaft and movable axially on said shaft by a given amount, the teeth of said driving gear being maintained in mesh relation with respect to the teeth of said driven gear throughout the axial movement of said driving gear, means to normally bias said driving gear with said second cam element axially toward said first cam element, a switching element disposed adjacent said second cam element for actuation thereby when said second cam element is moved by cam action axially away from said first cam element.

2. An electric generator according to claim 1 wherein said cam elements have complementary V-shaped portions, one receivable in the other for cam action and complementary U-shaped portions, the U-shaped portion of one of said elements being larger than the U-shaped portion of the other to receive the other for a limited relative rotational movement of said elements during which the cam portions cause one of said elements to move axially with respect to the other.

3. An electric generator comprising a housing, a drive shaft rotatably mounted in said housing, said shaft having thereon a first cam element, a driving gear having a second cam element for cooperation with said first cam element, and a rotor supporting sleeve, said first cam element being fixed to said shaft, said driving gear being rotatably carried by said shaft and movable axially thereof by a given amount, said sleeve being rotatably carried on said shaft and having gear teeth at one end thereof, a transfer gear having teeth adapted to mesh with the teeth of said driving gear throughout the axial movement of said driving gear and other teeth disposed in mesh relation with the gear teeth of said sleeve, means to normally bias said driving gear with said second cam element axially for coaction with said first cam element, a switch element disposed adjacent said driving gear for actuation upon axial movement of said driving gear.

4. An electric generator according to claim 3, wherein the working surfaces of said first cam element, said second cam element, said drive gear, said transfer gear, and said seleve are of plastic material.

References Cited in the file of this patent

UNITED STATES PATENTS

| | | |
|---|---|---|
| 785,499 | Kaisling | Mar. 21, 1905 |
| 1,796,437 | Burger | Mar. 17, 1931 |
| 2,084,612 | Engelhart | June 22, 1937 |
| 2,236,105 | McLarn | Mar. 25, 1941 |
| 2,487,328 | George et al. | Nov. 8, 1949 |
| 2,666,677 | Miller | Jan. 19, 1954 |